US011275290B2

(12) United States Patent
Jun et al.

(10) Patent No.: US 11,275,290 B2
(45) Date of Patent: Mar. 15, 2022

(54) CAMERA MODULE AND ELECTRONIC DEVICE

(71) Applicant: Samsung Electro-Mechanics Co., Ltd., Suwon-si (KR)

(72) Inventors: Jae Woo Jun, Suwon-si (KR); Chul Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/124,832

(22) Filed: Dec. 17, 2020

(65) Prior Publication Data

US 2021/0405505 A1    Dec. 30, 2021

(30) Foreign Application Priority Data

Jun. 30, 2020    (KR) .......................... 10-2020-0079974

(51) Int. Cl.
*G03B 9/02* (2021.01)
*G02B 26/02* (2006.01)

(52) U.S. Cl.
CPC .............. *G03B 9/02* (2013.01); *G02B 26/02* (2013.01)

(58) Field of Classification Search
CPC ... G03B 9/02; G03B 9/04; G03B 9/08; G03B 9/12; G03B 9/40; G02B 26/02
USPC ........................................ 396/326, 332, 340
See application file for complete search history.

(56) References Cited

U.S. PATENT DOCUMENTS

| 5,923,911 A * | 7/1999 | Uchiyama ............ G03B 19/026 396/322 |
|---|---|---|
| 2008/0007623 A1 | 1/2008 | Lee et al. |
| 2010/0328471 A1 | 12/2010 | Boland et al. |
| 2014/0198248 A1 | 7/2014 | Wernersson |

FOREIGN PATENT DOCUMENTS

| KR | 10-0809277 B1 | 3/2008 |
| KR | 10-1726694 B1 | 4/2017 |
| KR | 10-2018-0126705 A | 11/2018 |

OTHER PUBLICATIONS

Korean Office Action issued on Aug. 3, 2021 in counterpart Korean Patent Application No. 10-2020-0079974 (6 pages in English and 5 pages in Korean).

* cited by examiner

*Primary Examiner* — Christopher E Mahoney
(74) *Attorney, Agent, or Firm* — NSIP Law

(57) ABSTRACT

A camera module includes: a plurality of lens modules disposed in a first direction and a second direction intersecting an optical axis; a first light blocking member configured to move in the first direction to selectively expose the plurality of lens modules; a second light blocking member configured to move in the second direction to selectively expose the plurality of lens modules; and a driving assembly configured to drive the first light blocking member and the second light blocking member.

18 Claims, 18 Drawing Sheets

CAMERA MODULE AND ELECTRONIC DEVICE

CROSS-REFERENCE TO RELATED APPLICATIONS

This application claims the benefit under 35 U.S.C. § 119(a) of Korean Patent Application No. 10-2020-0079974 filed on Jun. 30, 2020 in the Korean Intellectual Property Office, the entire disclosure of which is incorporated herein by reference for all purposes.

BACKGROUND

1. Field

The following description relates to a camera module including a plurality of lens modules and an electronic device including the camera module.

2. Description of Related Art

A camera module may include a lens module for imaging light reflected from an object on an image sensor. A camera module may include components for focus adjustment and image stabilization. For example, a camera module may include a driving assembly for driving the lens module in an optical axis direction or a direction intersecting an optical axis. Generally, a camera module may have single optical properties. For example, it may be difficult for a camera module for short-range imaging to image an object located at long distance, and it may be difficult for a camera module for long-distance imaging to image an object located at short distance. Accordingly, it has been desirable to develop a camera module configured to clearly image an object located in various environmental conditions without replacing the lens module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a plurality of lens modules disposed in a first direction and a second direction intersecting an optical axis; a first light blocking member configured to move in the first direction to selectively expose the plurality of lens modules; a second light blocking member configured to move in the second direction to selectively expose the plurality of lens modules; and a driving assembly configured to drive the first light blocking member and the second light blocking member.

The first light blocking member may include a first rack extending in the first direction. The second light blocking member may include a second rack extending in the second direction.

The driving assembly may include a driving gear configured to be engaged with the first rack and the second rack.

The driving gear may include: a driving region including teeth; and a non-driving region excluding teeth.

The driving region may be formed in a rotationally symmetrical shape about a driving shaft of the driving gear.

An arc length formed in the driving region may be equal to a first length of a lens module, among the plurality of lens modules, in the first direction and a second length of the lens module in the second direction. The arc length may be greater than the first length and the second length, or may be equal to a gap between adjacent lens modules among the plurality of lens modules.

The driving assembly may further include: a driving motor; and a power transmission gear configured to be engaged with a pinion of the driving motor, coupled to the driving shaft of the driving gear, and configured to rotate integrally with the driving gear.

The camera module may further include: a first guide member configured to guide movement of the first light blocking member in the first direction; and a second guide member configured to guide movement of the second light blocking member in the second direction.

The first light blocking member may include first protrusions spaced apart by a first gap in the first direction and being in contact with the first guide member. The second light blocking member may include second protrusions spaced apart by a second gap in the second direction and being in contact with the second guide member.

The first guide member may include first grooves configured to partially receive the first protrusions, and spaced apart by the first gap. The second guide member may include second grooves configured to partially receive the second protrusions, and spaced apart by the second gap.

The first gap and the second gap may be equal to a first length of a lens module, among the plurality of lens modules, in the first direction and a second length of the lens module in the second direction, or the first gap and the second gap may be equal to a gap between adjacent lens modules among the plurality of lens modules.

The plurality of lens modules may include: a first lens module having first optical properties; and a second lens module having second optical properties.

The camera module may further include: a third lens module having third optical properties.

In another general aspect, an electronic device includes the camera module.

In another general aspect, a camera module includes: a plurality of lens modules arranged in columns extending in a first direction and rows extending in a second direction, wherein the first direction and the second direction intersect optical axes of the plurality of lens modules; a first light blocking member; a second light blocking member; and a driving member configured to selectively move the first light blocking member and the second light blocking member in the first direction and the second direction, respectively, to expose one or more lens modules among the plurality of lens modules.

The driving member may be further configured to selectively move the first light blocking member in only the first direction, and selectively move the second light blocking member in only the second direction.

The first light blocking member and the second light blocking member may be configured to move in increments in the first direction and the second direction, respectively, to expose different combinations of lens modules among the plurality of lens modules.

The first light blocking member may include a first rack extending in the first direction. The second light blocking member may include a second rack extending in the second direction. The driving member may include a gear including teeth disposed in driving regions, and the driving regions may be spaced apart such that the teeth are configured to selectively engage the first rack and the second rack.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
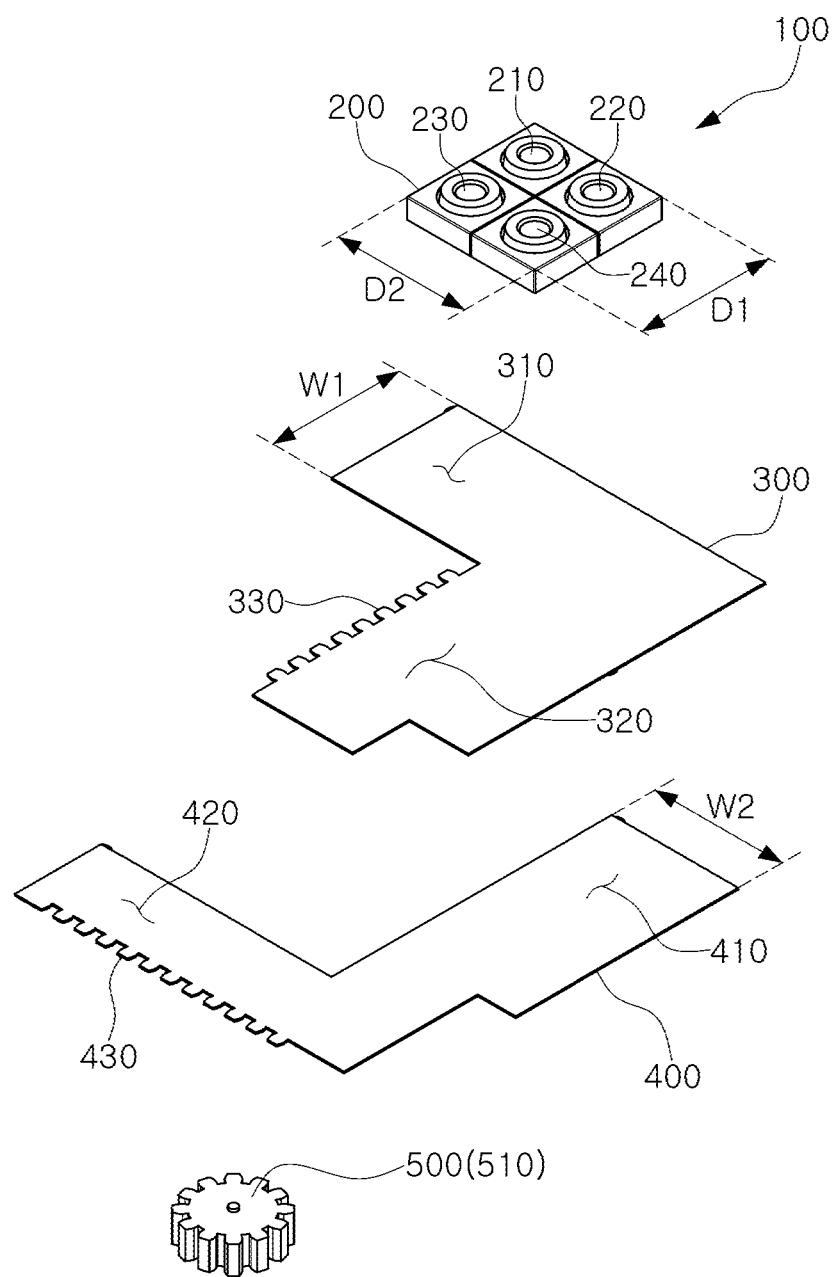
FIG. 1 is an exploded perspective diagram illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

A camera module in the example embodiments may be mounted on a portable electronic product. For example, the camera module may be mounted on a portable telephone, a laptop, or the like. However, the camera module is not limited to the foregoing examples. For example, the camera module may be installed in an ATM, a television for interactive broadcasting, or the like.

A camera module 100, according to an embodiment will be described with reference to FIGS. 1 and 2.

Figure 2:
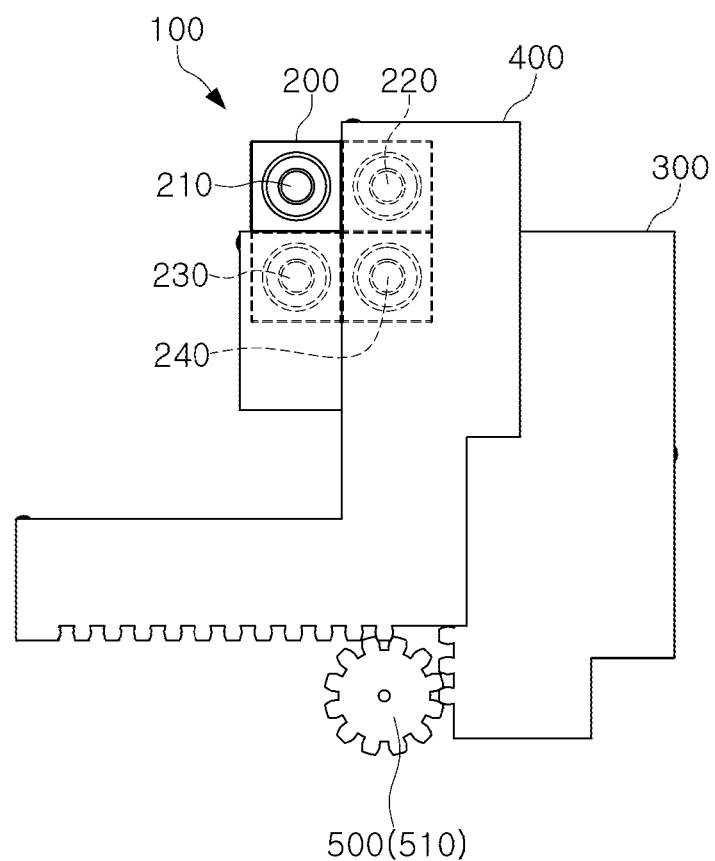
FIG. 2 is a diagram illustrating a combined state of the camera module illustrated in FIG. 1.

Referring to FIGS. 1 and 2, the camera module 100 may include, for example, a lens module assembly 200, a first light blocking member 300, a second light blocking member 400, and a driving assembly 500. However, the camera module 100 is not limited to the above-described example.

The lens module assembly 200 may include a plurality of lens modules. For example, the lens module 200 may include a first lens module 210, a second lens module 220, a third lens module 230, and a fourth lens module 240. The first lens module 210, the second lens module 220, the third lens module 230, and the fourth lens module 240 may be disposed in a first direction and a second direction intersecting the optical axis. For example, the first, second, third, and fourth lens modules 210, 220, 230, and 20 may be arranged in columns and rows extending in the first direction and the second direction, respectively. The first lens module 210, the second lens module 220, the third lens module 230, and the fourth lens module 240 may be configured to have predetermined optical properties. For example, the first lens module 210, the second lens module 220, the third lens module 230, and the fourth lens module 240 may be configured to have the same optical properties. As another example, the first lens module 210, the second lens module 220, the third lens module 230, and the fourth lens module 240 may be configured to have different optical properties.

The first light blocking member 300 may be configured to block light incident on the lens module assembly 200. For example, the first light blocking member 300 may move in a first direction intersecting an optical axis, and may selectively block light incident on the first lens module 210, the second lens module 220, the third lens module 230, and the fourth lens module 240.

The first light blocking member 300 may include a first light blocking portion 310 and a first driving portion 320. The first light blocking portion 310 may be configured to block light incident on the first lens module 210, the second lens module 220, the third lens module 230, and the fourth lens module 240. A first width W1 of the first light blocking portion 310 may be equal to or greater than a first length D1 of the lens module assembly 200 in the first direction. The first driving portion 320 may be configured to be coupled to the driving assembly 500. For example, a first rack 330 may be formed in the first driving portion 320. The first rack 330 may be formed in the first direction and may be engaged with the gear-shaped driving element of the driving assembly 500, for example, a driving gear 510. Accordingly, the first light blocking member 300 may move in the first direction by driving force of the driving assembly 500 transmitted through the first rack 330.

The second light blocking member 400 may include a second light blocking portion 410 and a second driving portion 420. The second light blocking portion 410 may be configured to block light incident on the first lens module 210, the second lens module 220, the third lens module 230, and the fourth lens module 240. A second width W2 of the second light blocking portion 410 may be equal to or greater than a second length D2 of the lens module assembly 200 in the second direction. The second driving portion 420 may be configured to be coupled to the driving assembly 500. For example, a second rack 430 may be formed in the second driving portion 420. The second rack 430 may formed in the second direction and may be engaged with the driving gear 510. Accordingly, the second light blocking member 400 may move in the second direction by driving force of the driving assembly 500 transmitted through the second rack 430.

The driving assembly 500 may be configured to drive the first light blocking member 300 and the second light blocking member 400. For example, the driving assembly 500 may be driven while being engaged with the first rack 330 of the first light blocking member 300 and the second rack 430 of the second light blocking member 400. As described above, the driving assembly 500 may include the driving gear 510, which may be a pinion gear, for example. Also, the driving assembly 500 may further include a driving motor 520 (FIG. 4) for driving the driving gear 510.

In the camera module 100 configured as described above, the first light blocking member 300 and the second light blocking member 400 may be disposed in front (on an object side) of the first lens module 210, the second lens module 220, the third lens module 230, and the fourth lens module 240, as illustrated in FIG. 2.

In the description below, an example of an operation of the camera module will be described with reference to FIGS. 2 and 3.

Figure 3:
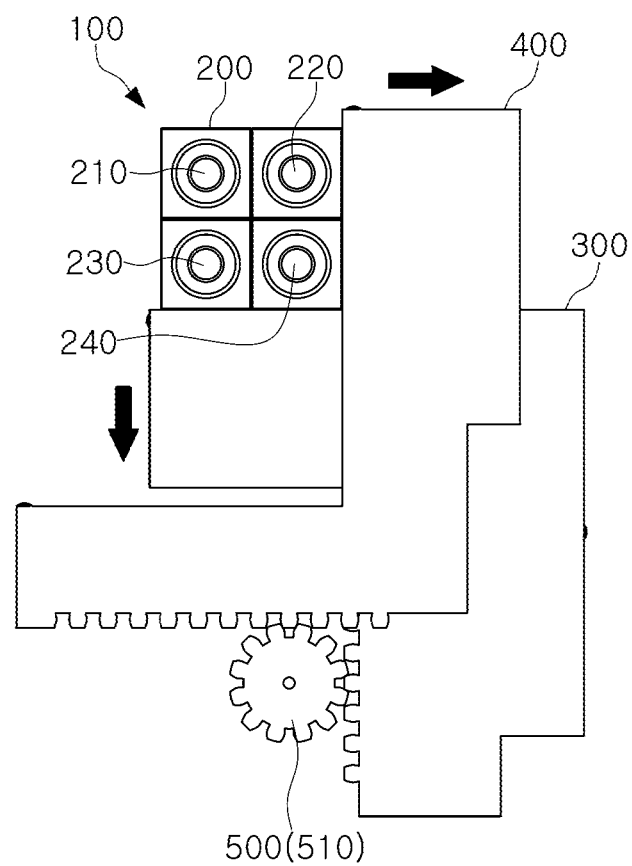
FIG. 3 is a diagram illustrating an operational state of the camera module illustrated in FIG. 2.

Referring to FIGS. 2 and 3, the camera module 100 may image a subject in two states. For example, the camera module 100 may be configured to image through a single lens module (e.g., the first lens module 210) of the lens module assembly 200. In this state, the camera module 100 may image a subject located at a short distance or a long distance through the first lens module 210.

As another example, the camera module 100 may be configured to image through the first lens module 210, the second lens module 220, the third lens module 230, and the fourth lens module 240. In this state, the camera module 100 may clearly image a subject located at a short distance or a long distance through the first lens module 210, the second lens module 220, the third lens module 230, and the fourth lens module 240. Also, the camera module 100 may clearly image a fast moving subject and a subject located in a low illuminance environment through the first lens module 210, the second lens module 220, the third lens module 230, and the fourth lens module 240. Also, the camera module 100 may simultaneously image a subject located at a short distance and a subject located at a long distance through the first lens module 210, the second lens module 220, the third lens module 230, and the fourth lens module 240.

The camera module 100 may, by selectively using the first lens module 210, the second lens module 220, the third lens module 230, and the fourth lens module 240, clearly image a subject located at a long distance and a short distance, and may also clearly image a fast moving subject or a subject located in a low illuminance environment. Also, the camera module 100 may prevent the unused lens modules (e.g. the second lens module 220, the third lens module 230, and the fourth lens module 240) from being externally exposed and may protect the unused lens modules 220, 230, and 240 from external impact, using the light blocking members 300 and 400.

In the description below, a camera module 102, according to an embodiment, will be described with reference to FIG. 4.

Figure 4:
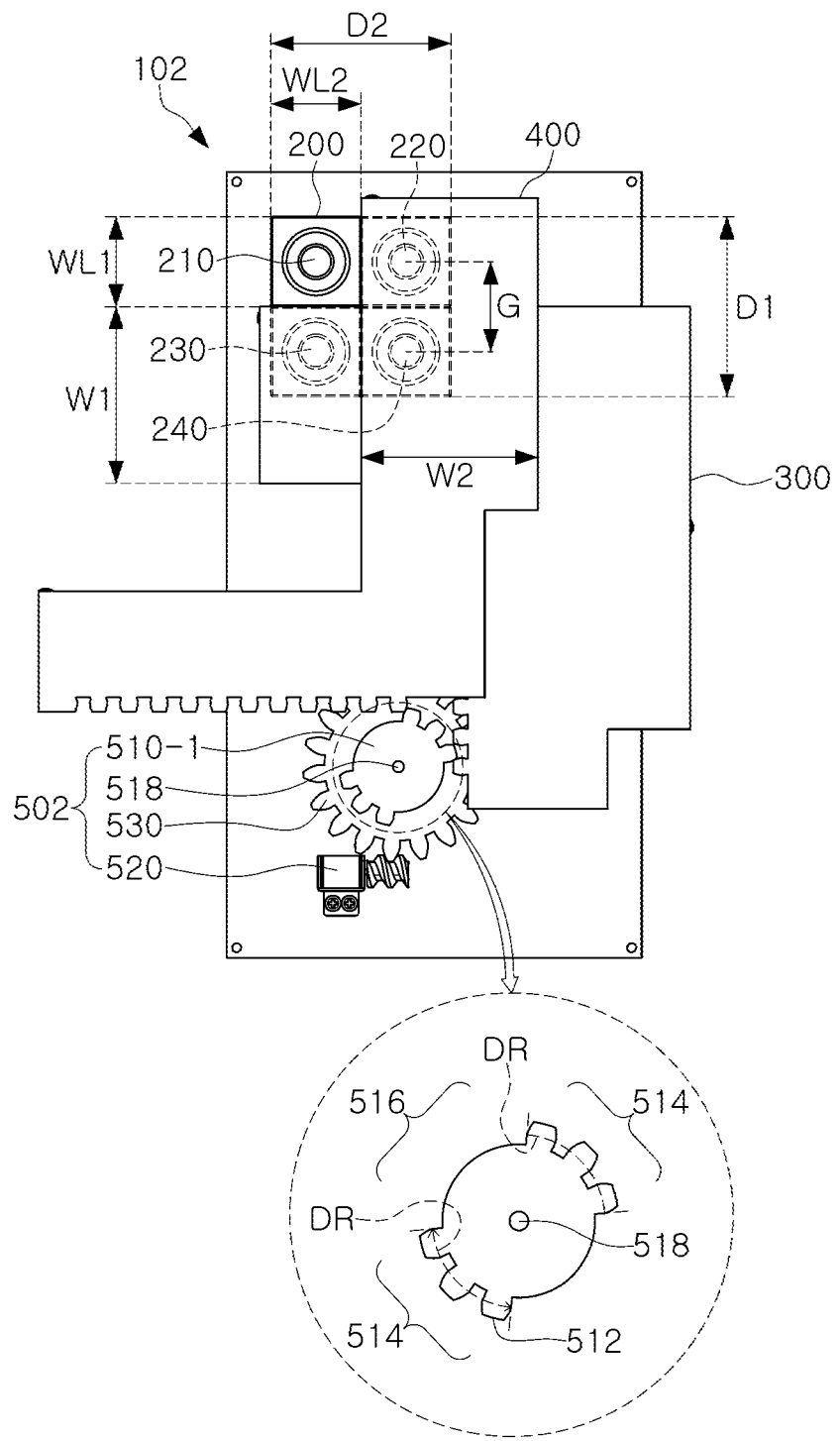
FIG. 4 is a diagram illustrating a configuration of a camera module, according to an embodiment.

Referring to FIG. 4, the camera module 102 may include the lens module assembly 200, the first light blocking member 300, the second light blocking member 400, and a driving assembly 502. However, the camera module 102 is not limited to the above-described example.

The lens module assembly 200 may include the first lens module 210, the second lens module 220, the third lens module 230, and the fourth lens module 240 disposed in the first direction and the second direction intersecting the optical axis. The first lens module 210, the second lens module 220, the third lens module 230, and the fourth lens module 240 may be configured to have predetermined optical properties. For example, the first lens module 210, the second lens module 220, the third lens module 230, and the fourth lens module 240 may be configured to have the same optical properties. As another example, the first lens module 210, the second lens module 220, the third lens module 230, and the fourth lens module 240 may be configured to have different optical properties.

The first light blocking member 300 may be configured to block light incident on the lens module assembly 200. For example, the first light blocking member 300 may move in a first direction intersecting the optical axis, and may selectively block light incident on the first lens module 210, the second lens module 220, the third lens module 230, and the fourth lens module 240.

The first light blocking member 300 may include the first light blocking portion 310 and the first driving portion 320. The first light blocking portion 310 may be configured to block light incident on the first lens module 210, the second lens module 220, the third lens module 230, and the fourth lens module 240. The first width W1 of the first light blocking portion 310 may be equal to or greater than the first length D1 of the lens module assembly 200 in the first direction. The first driving portion 320 may be configured to be coupled to the driving assembly 502. For example, the first rack 330 may be formed in the first driving portion 320. The first rack 330 may be formed in the first direction and may be engaged with a driving gear 510-1 of the driving assembly 500. Accordingly, the first light blocking member 300 may be moved in the first direction by the driving force of the driving assembly 502 transmitted through the first rack 330.

The second light blocking member 400 may include the second light blocking portion 410 and the second driving portion 420. The second light blocking portion 410 may be configured to block light incident on the first lens module 210, the second lens module 220, the third lens module 230, and the fourth lens module 240. The second width W2 of the second light blocking portion 410 may be equal to or greater than the length D2 of the lens module assembly 200 in the second direction. The second driving portion 420 may be configured to be coupled to the driving assembly 502. For example, the second rack 430 may be formed in the second driving portion 420. The second rack 430 may be formed in the second direction and may be engaged with the driving gear 510-1. Accordingly, the second light blocking member 400 may be moved in the second direction by the driving force of the driving assembly 502 transmitted through the second rack 430.

The driving assembly 502 may be configured to drive the first light blocking member 300 and the second light blocking member 400. The driving assembly 502 may include the driving gear 510-1, the driving motor 520, and a power transmission gear 530.

The driving gear 510-1 may be configured to be selectively engaged with the first light blocking member 300 and the second light blocking member 400. As an example, the driving gear 510-1 may include a driving region 514 in which teeth 512 are formed and a non-driving region 516 in which teeth are not formed. An arc length DR of the driving region 514 may be the same as a first-direction length WL1 and a second-direction length WL2 of the first, second, third, and fourth lens modules 210, 220, 230, and 240, may be greater than the first-direction length WL1 and the second-direction length WL2 of the first, second, third, and fourth lens modules 210, 220, 230, and 240, or may be the same as a gap G between the first, second, third, and fourth lens modules 210, 220, 230, and 240. This condition may be necessary to determine the amount of light blocking of the first light blocking member 300 and the second light blocking member 400 according to the driving of the driving gear 510-1. The driving region 514 may be formed in a rotationally symmetrical shape about a driving shaft 518 of the driving gear 514. For example, in the driving gear 514, two driving regions 514 may be formed in a symmetrical shape. The non-driving regions 516 may be formed between the driving regions 514.

The driving motor 520 may provide a driving force necessary for driving the driving gear 510-1. The driving force of the driving motor 520 may be transmitted to the driving gear 510-1 through the power transmission gear 530, which is engaged with a pinion of the driving motor 520. A rotation shaft of the power transmission gear 530 may be integrated with the driving shaft 518 of the driving gear 510-1. Accordingly, when the power transmission gear 530 is rotated by the driving motor 520, the driving gear 510-1 may also rotate with the power transmission gear 530.

In the description below, example operations of the camera module will be described with reference to FIGS. 4 to 6.

Figure 5:
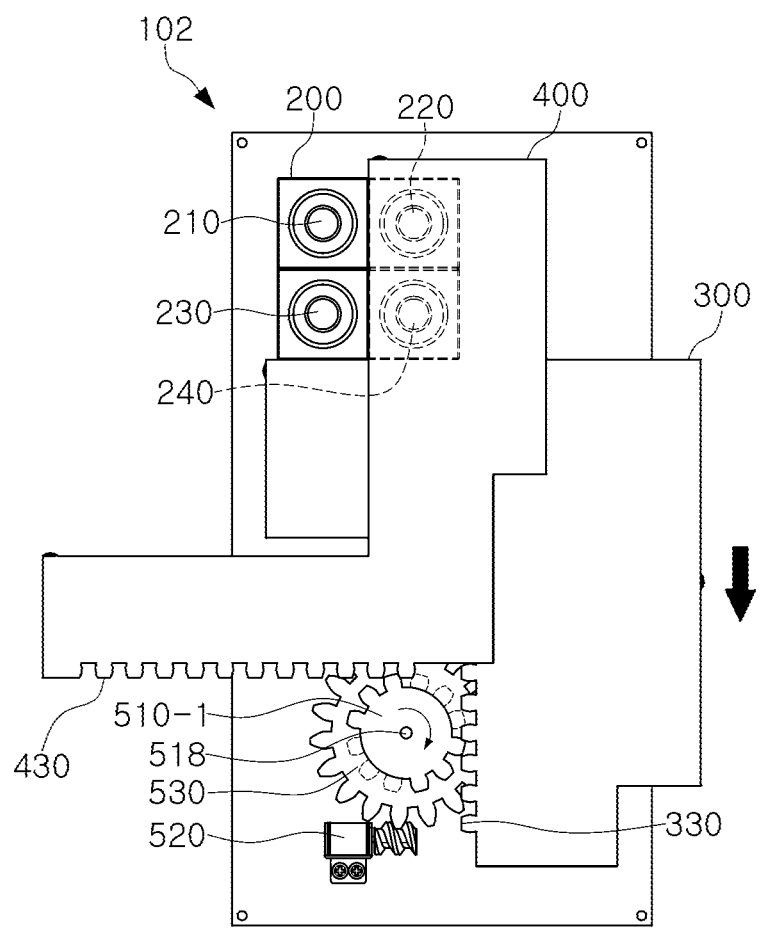
FIGS. 5 and 6 are diagrams illustrating an operational state of the camera module illustrated in FIG. 4.
Figure 6:
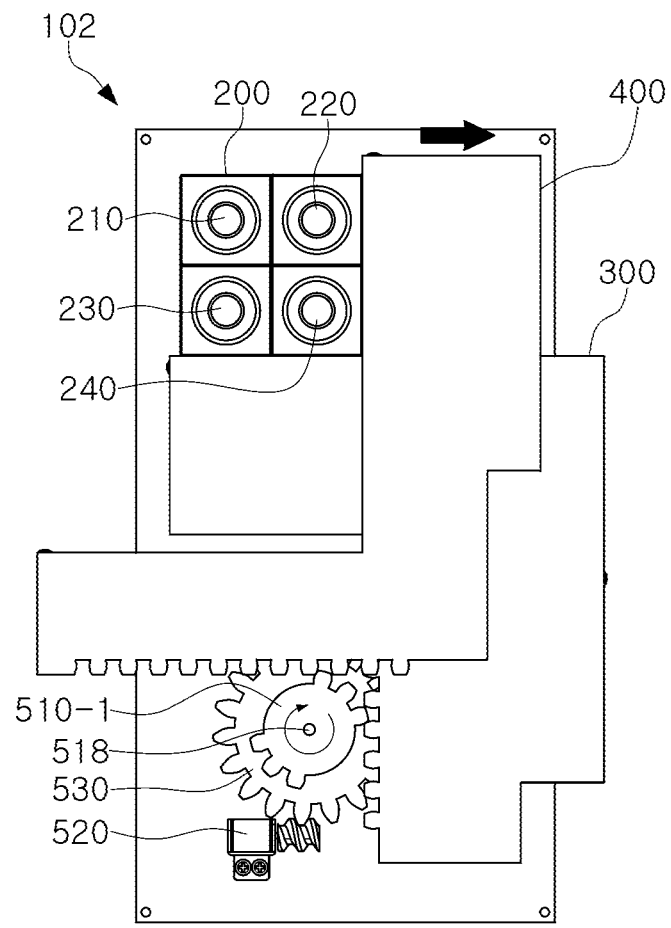

Referring to FIGS. 4 to 6, the camera module 102 may image a subject in three states (modes). For example, the camera module 102 may image in a first state (initial state), a second state, and a third state.

The first state (see FIG. 4) may be an initial state of the camera module 102. The camera module 102 may image through a single lens module of the lens module assembly 200 in the first state. For example, in the first state, the camera module 102 may image a subject located at a short distance or a long distance through the first lens module 210.

The second state (see FIG. 5) may be formed by driving the first light blocking member 300 in the first state. As illustrated in FIG. 5, the first light blocking member 300 may be moved downwardly in the second direction intersecting the optical axis by the driving gear 510-1. The second light blocking member 400 may not be driven by the driving gear 510 when the camera module 102 is being converted from the first state to the second state. For example, during a series of processes of converting from the first state to the second state, the first rack 330 of the first light blocking member 300 may be engaged with the driving region 514 of the driving gear 510-1 and may drive the first light blocking member 300, and since the second rack 430 of the second light blocking member 400 faces the non-driving region 516 of the driving gear 510-1, the second rack 430 may not cause driving of the second light blocking member 400.

The camera module 102 may image through the two lens modules 200 in the second state. For example, in the second state, the camera module 102 may image a subject located at a short distance or a long distance through the first lens module 210 and the third lens module 230. Alternatively, the camera module 102 may image a subject located at a short distance through the first lens module 210 and may image a background of the subject at a long distance through the third lens module 230. Alternatively, the camera module 102 may image different features of the same subject through the first lens module 210 and the third lens module 230, and may programmatically synthesize the obtained images.

The third state (see FIG. 6) may be formed by driving the second light blocking member 400 in the second state. The second light blocking member 400 may be moved to the right in the second direction intersecting the optical axis by the driving gear 510-1, as illustrated in FIG. 6. When the camera module 102 is converted from the second state to the third state, the first light blocking member 300 may not be driven by the driving gear 510-1. For example, during a series of processes of converting from the second state to the third state, the second rack 430 of the second light blocking member 400 may be engaged with the driving region 514 of the driving gear 510 and may drive the second light blocking member 400, and since the first rack 330 of the first light blocking member 300 faces the non-driving region 516 of the driving gear 510-1, the first rack 330 may not cause driving of the first light blocking member 300

The camera module 102 may image through the first, second, and third lens modules 210, 220, 230, and 240 in the third state. For example, in the third state, the camera module 102 may image a subject located at a short distance or a long distance through the first lens module 210, the second lens module 220, the third lens module 230, and the fourth lens module 240. Alternatively, the camera module 102 may image a subject located at a short distance through the first lens module 210 and the second lens module 220, and may image a background of the subject located at a long distance through the third lens module 230 and the fourth lens module 240. Alternatively, the camera module 102 may image different features of the same subject through the first lens module 210, the second lens module 220, the third lens module 230, and the fourth lens module 240, and may programmatically synthesize the obtained images. For example, the camera module 102 may image a subject in a low-illumination environment with high resolution or may clearly image a subject moving at a high speed through the first, second, third, and fourth lens modules 210, 220, 230, and 240.

The camera module 102 configured as described above may quickly and accurately image subjects located in different imaging environments through the first, second, third, and fourth lens modules 210, 220, 230, and 240.

In the description below, a camera module 104, according to an embodiment, will be described with reference to FIGS. 7, 8A, and 8B.

Figure 7:
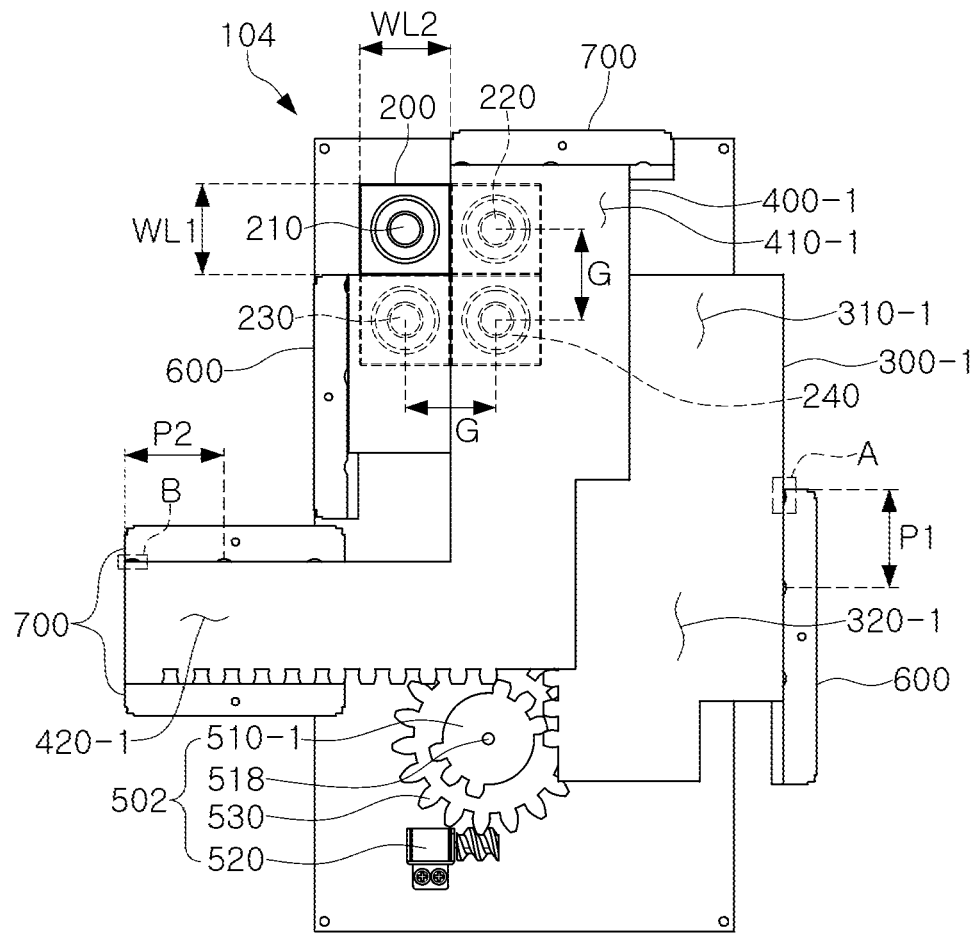
FIGS. 7, 8A, and 8B are diagrams illustrating a configuration of a camera module, according to an embodiment.
Figure 8A:
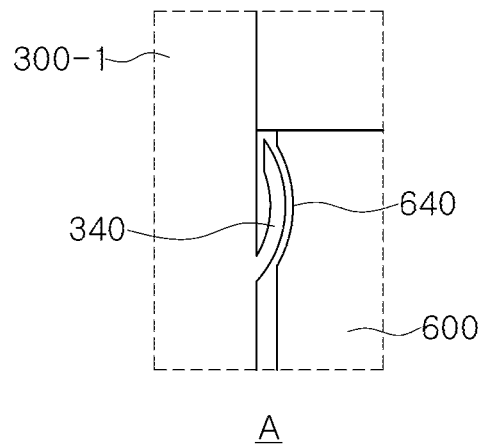
Figure 8B:
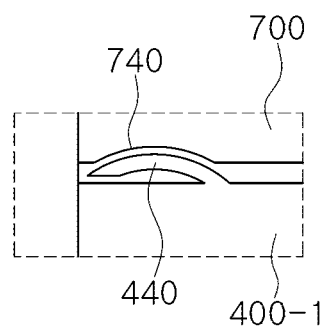

Referring to FIGS. 7, 8A and 8B, the camera module 104 may include the lens module assembly 200, a first light blocking member 300-1, a second light blocking member 400-1, and the driving assembly 502. Also, the camera module 104 may further include guide members 600 and 700. However, the camera module 104 is not limited to the above-described example. Since the first and second light blocking members 300-1 and 400-1 and the driving assembly 502 are similar to the first and second light blocking members 300 and 400 and the driving assembly 502 of the camera module 102 described above, descriptions thereof will not be repeated, except that differences in the first and second light blocking members 300-1 and 400-1 will be described.

The guide members 600 and 700 may be configured to allow the light blocking members 300-1 and 400-1 to smoothly move. For example, the first guide member 600 may allow the first light blocking member 300-1 to stably move in the first direction intersecting the optical axis, and the second guide member 700 may allow the second light blocking member 400-1 to stably move in the second direction intersecting the optical axis.

The guide members 600 and 700 may be configured to be in contact with first and second driving portions 320-1 and 420-1 of the light blocking members 300-1 and 400-1. For example, the first guide member 600 may be configured to be in contact with one surface of the first driving portion 320-1 of the first light blocking member 300-1, and the second guide member 700 may be configured to be in contact with both side surfaces of the second driving portion 420-1 of the second light blocking member 400-1. However, the guide members 600 and 700 may not be formed to only be in contact with the first and second driving portions 320-1 and 420-1 of the first and second light blocking members 300-1 and 400-1. For example, the first guide member 600 may be configured to be in contact with one surface of a first light blocking portion 310-1 of the first light blocking member 300-1, and the second guide member 700 may be configured to be in contact with one surface of a second light blocking portion 410-1 of the second light blocking member 400-1.

The camera module 104 may be configured to enable intermittent movement of the light blocking members 300-1 and 400-1. For example, the light blocking members 300-1 and 400-1 may intermittently move by a size equal to a width WL of the first, second, third, and fourth lens modules 210, 220, 230, and 240 or a gap G between the first, second, third, and fourth lens modules 210, 220, 230, and 240. To this end, first and second protrusions 340 and 440 may be formed in the first and second light blocking members 300-1 and 400-1, respectively, and first and second grooves 640 and 740 may be formed in the first and second guide members 600 and 700, respectively, as illustrated in FIGS. 8A and 8B. For example, the first protrusions 340 may be formed on the first light blocking member 300-1, spaced apart by a first gap P1 in the first direction, and the second protrusions 440 may be formed on the second light blocking member 400-1, spaced apart by a second gap P2 in the second direction. Also, the first grooves 640 may be formed in the first guide member 600, spaced apart by the first gap P1 along the first direction, and the second grooves 740 may be formed in the second guide member 700, spaced apart by the second gap P2 along the second direction. The first gap P1 and the second gap P2 may be the same as the first-direction length WL1 and the second-direction length WL2 of the first, second, third, and fourth lens modules 210, 220, 230, and 240 or the gap G between the first, second, third, and fourth lens modules 210, 220, 230, and 240. The first and second protrusions 340 and 440 may be configured to elastically change. For example, the first protrusion 340 may elastically change in a direction intersecting the first direction and may be separated from the first groove 640, and the second protrusion 440 may elastically change in a direction intersecting the second direction and may be separated from the second groove 740.

The camera module 104 configured as above may adjust the amount of movement of the light blocking members 300-1 and 400-1 in a unit size (e.g., a fixed increment) through the first and second protrusions 340 and 440 and the first and second grooves 640 and 740. Also, the camera module 104 may stably maintain positions of the first and second light blocking members 300-1 and 400-1 through the first and second protrusions 340 and 440 and the first and second grooves 640 and 740.

The first, second, third, and fourth lens modules 210, 220, 230, and 240 may have different optical properties. The first, second, third, and fourth lens modules 210, 220, 230, and 240 will be described in more detail with reference to FIGS. 9A to 9D.

Figure 9A:
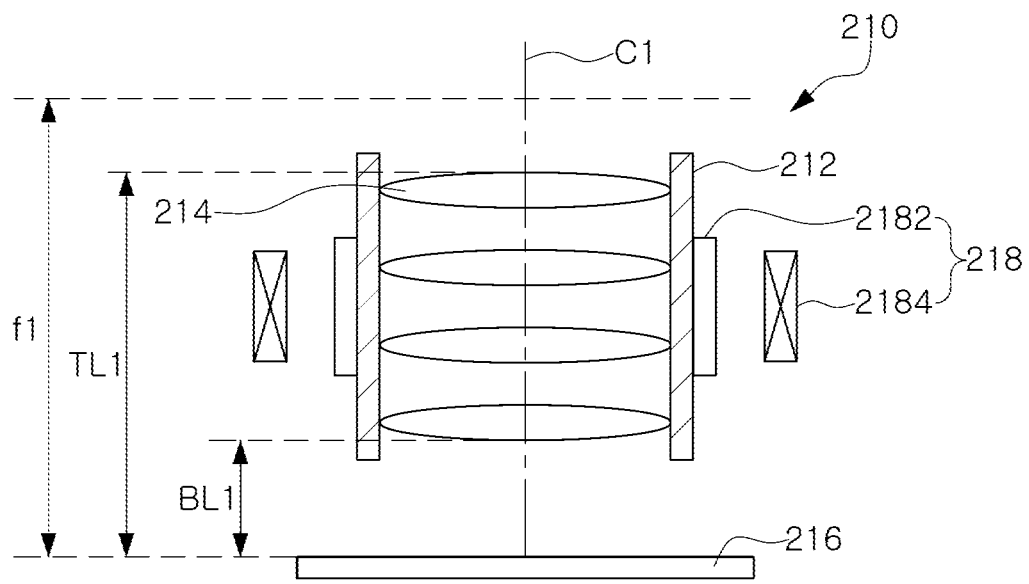
FIGS. 9A to 9D are diagrams illustrating examples of various types of lens modules mounted on a camera module.

Referring to FIG. 9A, the first lens module 210 may include a first lens barrel 212 and a first plurality of lenses 214. For example, the first lens module 210 may include four lenses 214. However, the number of lenses included in the first lens module 210 is not limited to four. For example, the first lens module 210 may include three or less lenses. As another example, the first lens module 210 may include five or more lenses. The first lens module 210 may be configured to enable focus adjustment. For example, the first lens module 210 may include a first focus adjustment assembly 218 for driving the first lens barrel 212 in a direction of a first optical axis C1. The first focus adjustment assembly 218 may include a first driving magnet 2182 and a first driving coil 2184. The first lens module 210 may be configured to exhibit first optical properties. For example, the first lens module 210 may have a first focal length f1, a first rear focal length BL1 (a distance from an image side surface of a rearmost lens to a first image sensor 216), and a first optical length TL1 (a distance from an object side surface of a frontmost lens to the first image sensor 216). The first lens module 210 may be configured to be specialized for long-distance imaging. For example, the first focal length f1 of the first lens module 210 may be equal to or greater than the first optical length TL1.

Figure 9B:
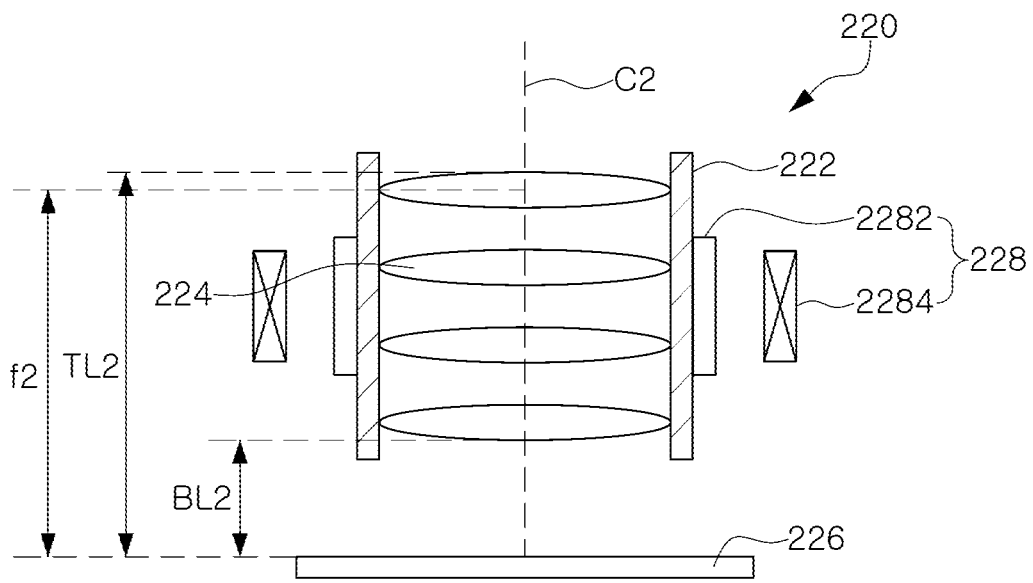

Referring to FIG. 9B, the second lens module 220 may include a second lens barrel 222 and a second plurality of lenses 224. For example, the second lens module 220 may include four lenses 224. However, the number of lenses included in the second lens module 220 is not limited to four. For example, the second lens module 220 may include three or less lenses. As another example, the second lens module 220 may include five or more lenses. The second lens module 220 may be configured to enable focus adjustment. For example, the second lens module 220 may include a second focus adjustment assembly 228 for driving the second lens barrel 222 in a direction of a second optical axis C2. The second focus adjustment assembly 228 may include a second driving magnet 2282 and a second driving coil 2284. The second lens module 220 may be configured to exhibit second optical properties. For example, the second lens module 220 may have a second focal length f2, a second rear focal length BL2 (a distance from an image side surface of a rearmost lens to a second image sensor 226), and a second optical length TL2 (a distance from the object side of a frontmost lens to the second image sensor 226). The second lens module 220 may be configured to be specialized for short-range imaging. For example, a second focal length f2 of the second lens module 220 may be less than the second optical length TL2.

Figure 9C:
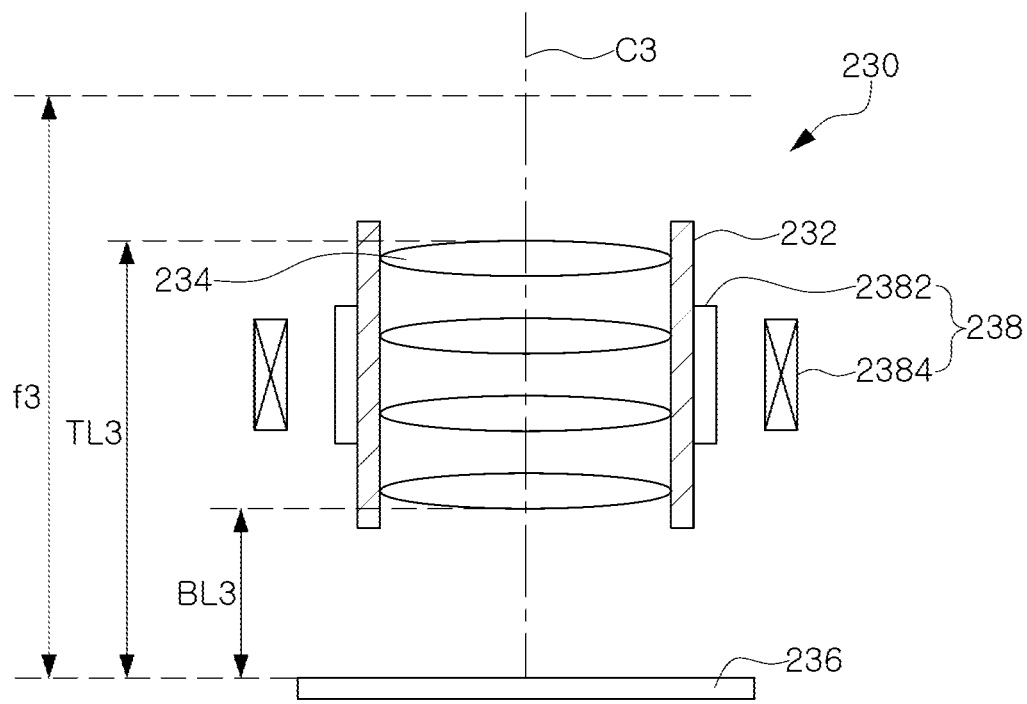

Referring to FIG. 9C, the third lens module 230 may include a third lens barrel 232 and a third plurality of lenses 234. For example, the third lens module 230 may include four lenses 234. However, the number of lenses included in the third lens module 230 is not limited to four. As an example, the third lens module 230 may include three or less lenses. As another example, the third lens module 230 may include five or more lenses. The third lens module 230 may be configured to enable focus adjustment. For example, the third lens module 230 may include a third focus adjustment assembly 238 for driving the third lens barrel 232 in a direction of a third optical axis C3. The third focus adjustment assembly 238 may include a third driving magnet 2382 and a third driving coil 2384. The third lens module 230 may be configured to exhibit third optical properties. For example, the third lens module 230 may include a third focal length f3, a third rear focal length BL3 (a distance from an image side surface of a rearmost lens to a third image sensor 236), and a third optical length TL3 (a distance from an object side surface of a frontmost lens to the third image sensor 236). The third lens module 230 may be configured to be specialized for long-distance imaging. For example, the third focal length f3 of the third lens module 230 may be equal to or greater than the third optical length TL3.

Figure 9D:
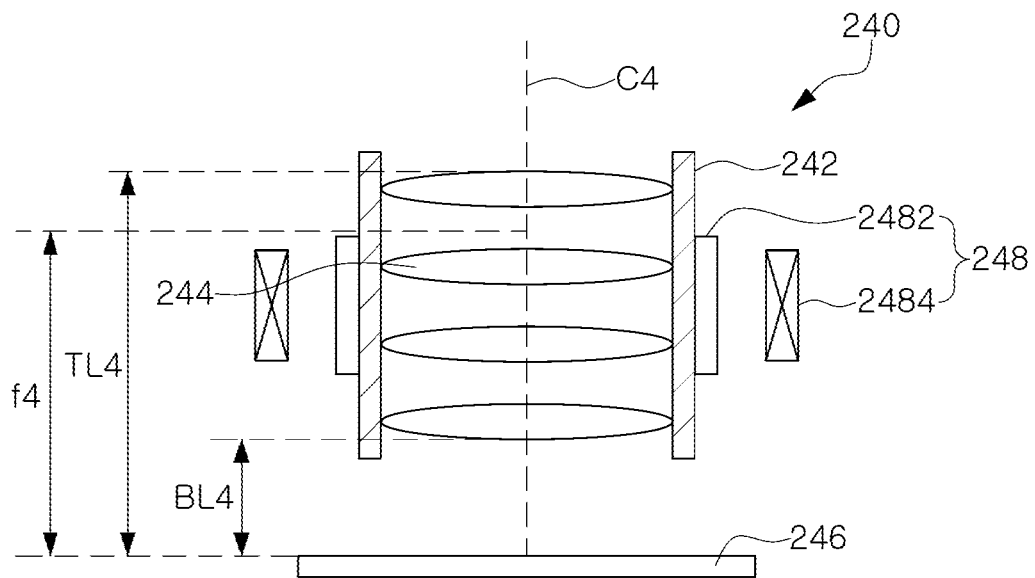

Referring to FIG. 9D, the fourth lens module 240 may include a fourth lens barrel 242 and a fourth plurality of lenses 244. For example, the fourth lens module 240 may include four lenses 244. However, the number of lenses included in the fourth lens module 240 is not limited to four. As an example, the fourth lens module 240 may include three or less lenses. As another example, the fourth lens module 240 may include five or more lenses. The fourth lens module 240 may be configured to enable focus adjustment. For example, the fourth lens module 240 may include a fourth focus adjustment assembly 248 for driving the fourth lens barrel 242 in a direction of a fourth optical axis C4. The fourth focus adjustment assembly 248 may include a fourth driving magnet 2482 and a fourth driving coil 2484. The fourth lens module 240 may be configured to exhibit fourth optical properties. For example, the fourth lens module 240 may have a fourth focal length f4, a fourth rear focal length BL4 (a distance from an image side surface of a rearmost lens to the fourth image sensor 246), and a fourth optical length TL4 (a distance from an object side surface of a frontmost lens to a fourth image sensor 246). The fourth lens module 240 may be configured to be specialized for short-range imaging. For example, the fourth focal length f4 of the fourth lens module 240 may be less than the fourth optical length TL4.

A predetermined relationship may be established between the first, second, third, and fourth lens modules 210, 220, 230, and 240. For example, the first focal length f1 of the first lens module 210 may be greater than the second focal length f2 of the second lens module 220, and the third focal length f3 of the third lens module 230 may be greater than the fourth focal length f4 of the fourth lens module 240. Also, the first focal length f1 of the first lens module 210 may be less than the third focal length f3 of the third lens module 230 and the fourth focal length f4 of the fourth lens module 240 may be less than the second focal length f2 of the second lens module 220.

As another example, the first rear focal length BL1 of the first lens module 210 may be greater than the second rear focal length BL2 of the second lens module 220, and the third rear focal length BL3 of the third lens module 230 may be longer than the fourth rear focal length BL4 of the fourth lens module 240. Also, the first rear focal length BL1 of the first lens module 210 may be less than the third rear focal length BL3 of the third lens module 230, and the second rear focal length BL2 of the second lens module 220 may be greater than or equal to the fourth rear focal length BL4 of the fourth lens module 240.

The camera module 104 configured as above may clearly image a subject located at a long distance and a short distance and may clearly image a fast moving subject and a subject located in low illuminance environment, by selectively using the first, second, third, and fourth lens modules 210, 220, 230, and 240. Also, the camera module 104 may prevent external exposure of the unused lens modules 220, 230, and 240 through the first and second light blocking members 300 and 400, and may protect the unused lens modules 220, 230, and 240 from external impact. Also, the camera module 104 may intermittently drive the first and second light blocking members 300 and 400 to accurately perform selective imaging through the first, second, third, and fourth lens modules 210, 220, 230, and 240.

In the description below, a camera module 106, according to an embodiment, will be described with reference to FIG. 10.

Figure 10:
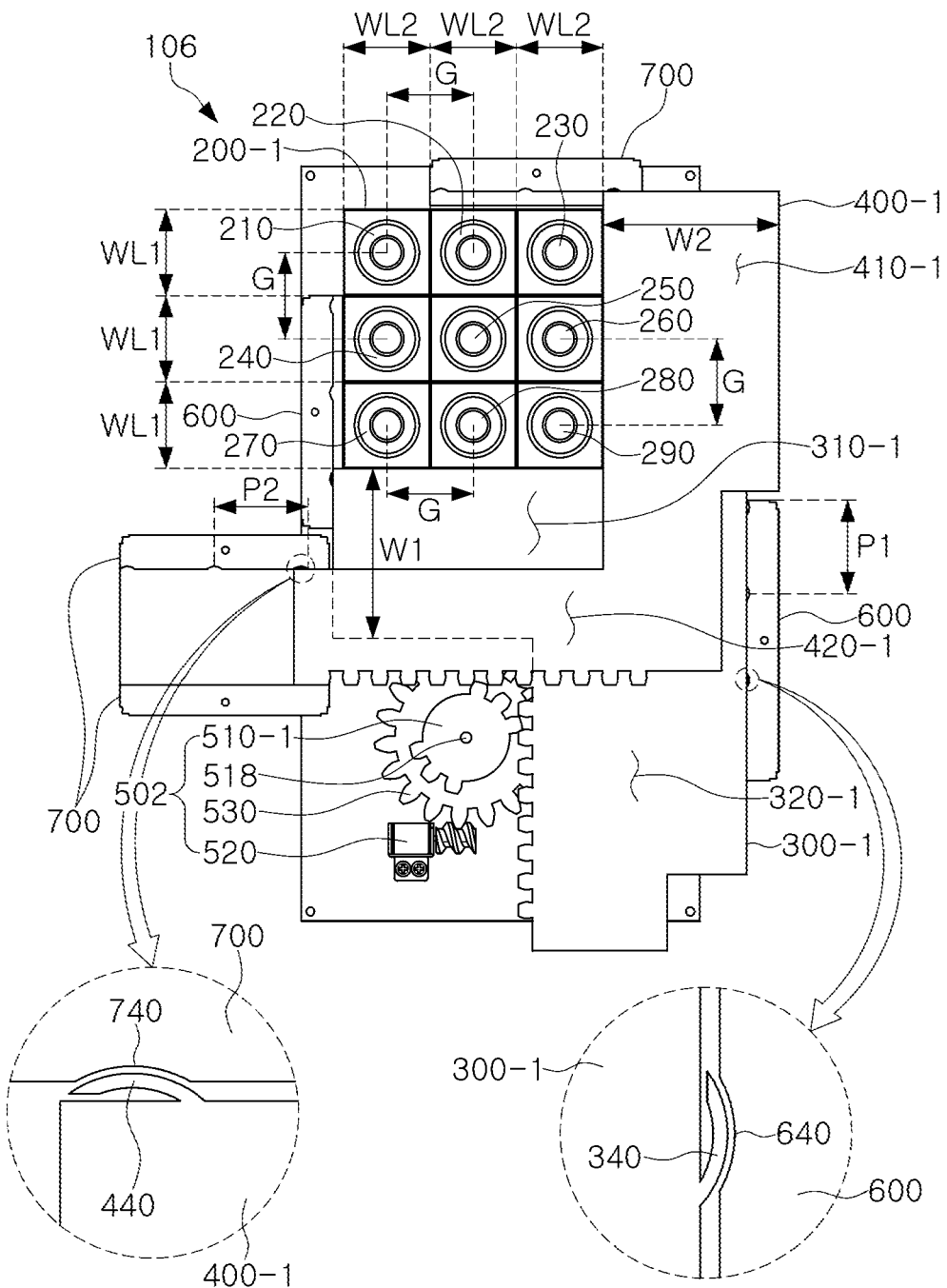
FIG. 10 is a diagram illustrating a portion of a combined camera module, according to an embodiment.
Figure 11:
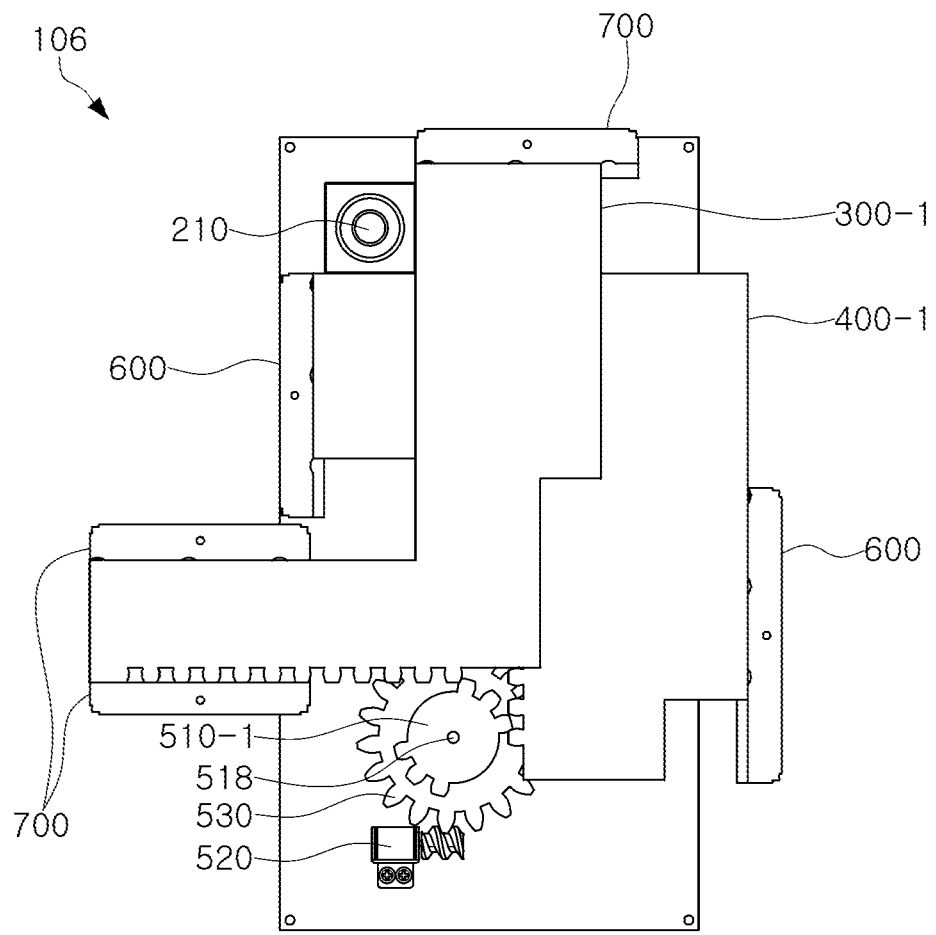
FIGS. 11 to 15 are diagrams illustrating an operational state of the camera module illustrated in FIG. 10.

Referring to FIG. 10, the camera module 106 may include a lens module assembly 200-1, the first light blocking member 300, the second light blocking member 400-1, the driving assembly 502, and the first and second guide members 600 and 700. However, the configuration of the camera module 106 is not limited to the above-described example.

The lens module assembly 200-1 may include a plurality lens modules. For example, the lens module assembly 200-1 may include the first lens module 210, the second lens module 220, the third lens module 230, the fourth lens module 240, a fifth lens module 250, a sixth lens module 260, a seventh lens module 270, an eighth lens module 280, and a ninth lens module 290 disposed in the first direction and the second direction intersecting the optical axis.

The first lens module 210 to the ninth lens module 290 may be configured to exhibit predetermined optical properties. For example, the first lens module 210 to the ninth lens module 290 may have the same optical properties, or one or more lens modules among the first lens module 210 to the ninth lens module 290 may have different optical properties. The first lens module 210 to the ninth lens module 290 may be configured to have one of the shapes illustrated in FIGS. 9A to 9D. However, the shape of the first lens module 210 to the ninth lens module 290 is not limited to the shape illustrated in FIGS. 9A to 9D.

The first light blocking member 300-1 may include the first light blocking portion 310-1 and the first driving portion 320-1. The first light blocking portion 310-1 may be configured to selectively block light incident on the first to ninth lens modules 210 to 290. The first light blocking member 300-1 may be configured to block light incident on the fourth to ninth lens modules 240, 250, 260, 270, 280, and 290. For example, an area of the first light blocking portion 310-1 may be larger than a total area ((WL1*2)*(WL2*3)) of the lens modules 240, 250, 260, 270, 280, and 290. The first driving portion 320 may be configured to be coupled to the driving assembly 502. For example, the first rack 330 may be formed in the first driving portion 320-1. The first rack 330 may be formed along the first direction, and may be engaged with the driving gear 510-1 of the driving assembly 502. Accordingly, the first light blocking member 300-1 may move in the first direction through the first rack 330.

The second light blocking member 400-1 may include the second light blocking portion 410-1 and the second driving portion 420-1. The second light blocking portion 410-1 may be configured to selectively block light incident on the first to ninth lens modules 210 to 290. The second light blocking member 400-1 may be configured to block light incident on the second, third, fifth, sixth, eight, and ninth lens modules 220, 230, 250, 260, 280, and 290. For example, an area of the second light blocking portion 410-1 may be larger than a total area ((WL1*3)*(WL2*2)) of the lens modules 220, 230, 250, 260, 280, and 290. The second driving portion 420-1 may be configured to be coupled to the driving assembly 502. For example, the second rack 430 may be formed in the second driving portion 420-1. The second rack 430 may be formed along the second direction, and may be engaged with the driving gear 510-1 of the driving assembly 502. Accordingly, the second light blocking member 400-1 may move in the second direction through the second rack 430.

The driving assembly 502 may be configured to drive the first light blocking member 300-1 and the second light blocking member 400-1. The driving assembly 502 may include the driving gear 510-1, the driving motor 520, and the power transmission gear 530.

The driving gear 510-1 may be configured to be selectively engaged with the first light blocking member 300-1 and the second light blocking member 400-1. As an example, the driving gear 510-1 may include the driving region 514 in which the teeth 512 are formed and the non-driving region 516 in which teeth are not formed. The arc length DR of the driving region 514 may be equal to the first-direction length WL1 and the second-direction length WL2 of the first to ninth lens modules 210, 220, 230, 240, 250, 260, 270, 280, and 290, may be greater than the first-direction length WL1 and the second-direction length WL2 of the first to ninth lens modules 210, 220, 230, 240, 250, 260, 270, 280, and 290, or may be the same as the gap G between the first to ninth lens modules 210, 220, 230, 240, 250, 260, 270, 280, and 290. This condition may be necessary to determine the amount of light blocking of the first light blocking member 300-1 and the second light blocking member 400-1 according to the driving of the driving gear 510-1. The driving region 514 may be formed in a rotationally symmetrical shape about the driving shaft 518 of the driving gear 514. For example, in the driving gear 514, two driving regions 514 may be formed in a symmetrical shape. The non-driving region 516 may be formed between the driving regions 514.

The driving motor 520 may provide driving force for driving the driving gear 510-1. The driving force of the driving motor 520 may be transmitted to the driving gear 510-1 through the power transmission gear 530 engaged with a pinion of the driving motor 520. The rotation shaft of the power transmission gear 530 may be integrated with the driving shaft 518 of the driving gear 510-1. Accordingly, when the power transmission gear 530 rotates by the driving motor 520, the driving gear 510-1 may also rotate together with the power transmission gear 530.

The first and second guide members 600 and 700 may be configured to allow the light blocking members 300-1 and 400-1 to smoothly move. For example, the first guide member 600 may be configured to allow the first light blocking member 300-1 to move substantially stably in the first direction intersecting the optical axis, and the second guide member 700 may be configured to allow the second light blocking member 400-1 to move substantially stably in the second direction intersecting the optical axis.

The first and second guide members 600 and 700 may be configured to be in contact with the driving portions 320-1 and 420-1 of the light blocking members 300-1 and 400-1. For example, the first guide member 600 may be formed to be in contact with one surface of the first driving portion 320-1 of the first light blocking member 300, and the second guide member 700 may be configured to be in contact with both side surfaces of the second driving portion 420-1 of the second light blocking member 400-1. However, the camera module 106 is not limited to the aforementioned configuration, and the first and second guide members 600 and 700 may not be configured to be only in contact with the first and second driving portions 320-1 and 420-1 of the first and second light blocking members 300-1 and 400-1. For example, the first guide member 600 may be configured to be in contact with one surface of the first light blocking portion 310-1 of the first light blocking member 300-1, and the second guide member 700 may be configured to be in contact with one surface of the second light blocking portion 410-1 of the second light blocking member 400-1.

The camera module 106 may be configured to enable intermittent movement of the first and second light blocking members 300-1 and 400-1. For example, the first and second light blocking members 300-1 and 400-1 may intermittently move by a size equal to the widths WL1 and WL2 of the first to ninth lens modules 210, 220, 230, 240, 250, 260, 270, 280, and 290 or the gap G between the first to ninth lens modules 210, 220, 230, 240, 250, 260, 270, 280, and 290. To this end, the first and second protrusions 340 and 440 and the first and second grooves 640 and 740 may be formed in the first and second light blocking members 300-1 and 400-1 and the first and second guide members 600 and 700, respectively. For example, the first protrusions 340 may be formed on the first light blocking member 300-1 and spaced apart by the first gap P1 along the first direction, and the second protrusions 440 may formed on the second light blocking member 400-1 and spaced apart by the second gap P2 along the second direction. Also, the first grooves 640 may be formed in the first guide member 600 and spaced apart by the first gap P1 along the first direction, and the second grooves 740 may be formed in the second guide member 700 and spaced apart by the second gap P2 along the second direction. The first and second protrusions 340 and 440 may be configured to elastically change. For example, the first protrusion 340 may elastically change in a direction intersecting the first direction and may be separated from the first groove 640, and the second protrusion 440 may elastically change in a direction intersecting the second direction and may be separated from the second groove 740.

In the description below, example operations of the camera module 106 will be described with reference to FIGS. 11 to 15.

The camera module 106 may image a subject in five states (modes). For example, the camera module 106 may change the imaging state to a first state (initial state), a second state, a third state, a fourth state, and a fifth state.

The first state (see FIG. 11) may be an initial state of the camera module 106. The camera module 106 may image through a single lens module, for example, the first lens module 210, in the first state. For example, in the first state, the camera module 106 may image a subject located at a short distance or a long distance through the first lens module 210.

Figure 12:
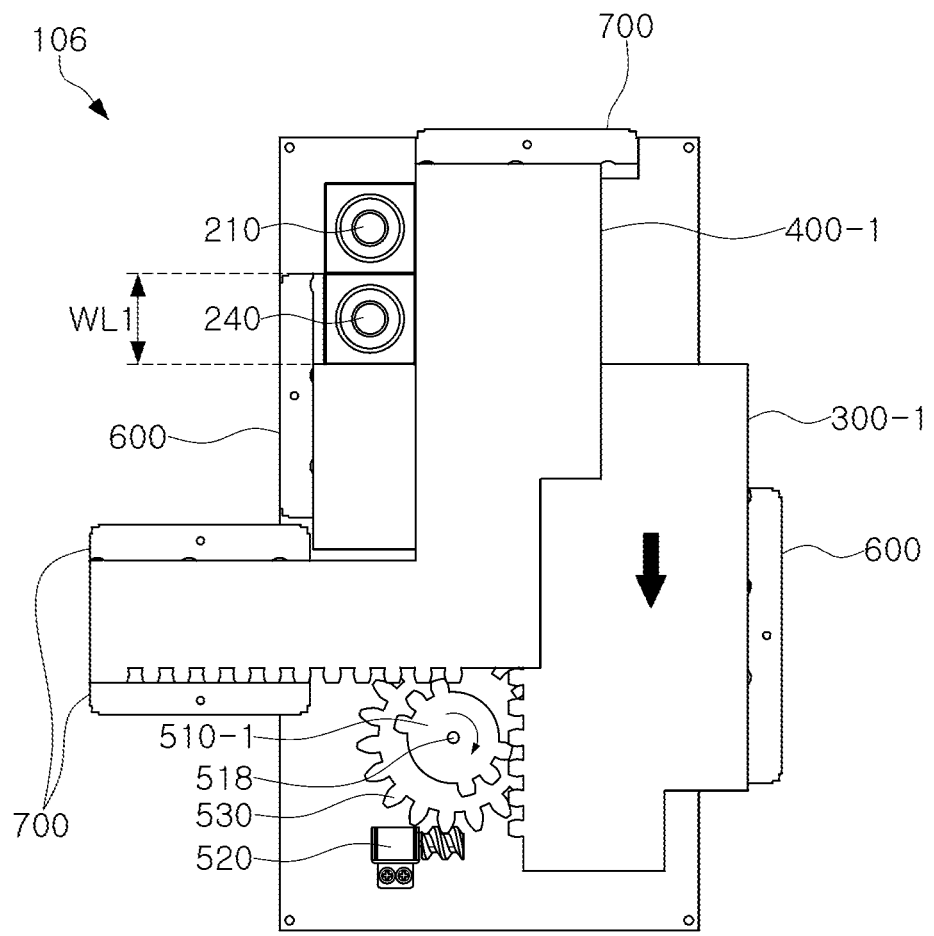

The second state (see FIG. 12) may be formed by driving the first light blocking member 300-1 in the first state. As illustrated in FIG. 12, the first light blocking member 300-1 may be moved downwardly along the first direction intersecting the optical axis by the driving gear 510-1. The displacement of the first light blocking member 300-1 may be limited to the width WL1 of the fourth lens module 240. When the camera module 106 is converted from the first state to the second state, the second light blocking member 400-1 may not be driven by the driving gear 510. For example, during a series of processes of converting the camera module 106 from the first state to the second state, the first rack 330 of the first light blocking member 300-1 may be engaged with the driving region 514 of the driving gear 510-1 and may enable the driving of the first light blocking member 300-1, and since the second rack 430 of the second light blocking member 400-1 faces the non-driving region 516 of the driving gear 510-1, the second rack 430 may not cause driving of the second light blocking member 400-1.

The camera module 106 may image through the two lens modules, for example, the first lens module 210 and the fourth lens module 240, in the second state. In the second state, the camera module 106 may image a subject located at a short distance or a long distance through the first lens module 210 and the fourth lens module 240, or may image different subjects located at the short distance and a long distance. For example, the camera module 106 may image subjects located at the same distance through the first lens module 210 and the fourth lens module 240. Alternatively, the camera module 106 may image a subject located at a short distance through the first lens module 210 and may image a background of a subject at a long distance through the fourth lens module 240. Alternatively, the camera module 106 may image subjects located at the same distance through the first lens module 210 and the fourth lens module 240, and may programmatically synthesize the obtained images.

Figure 13:
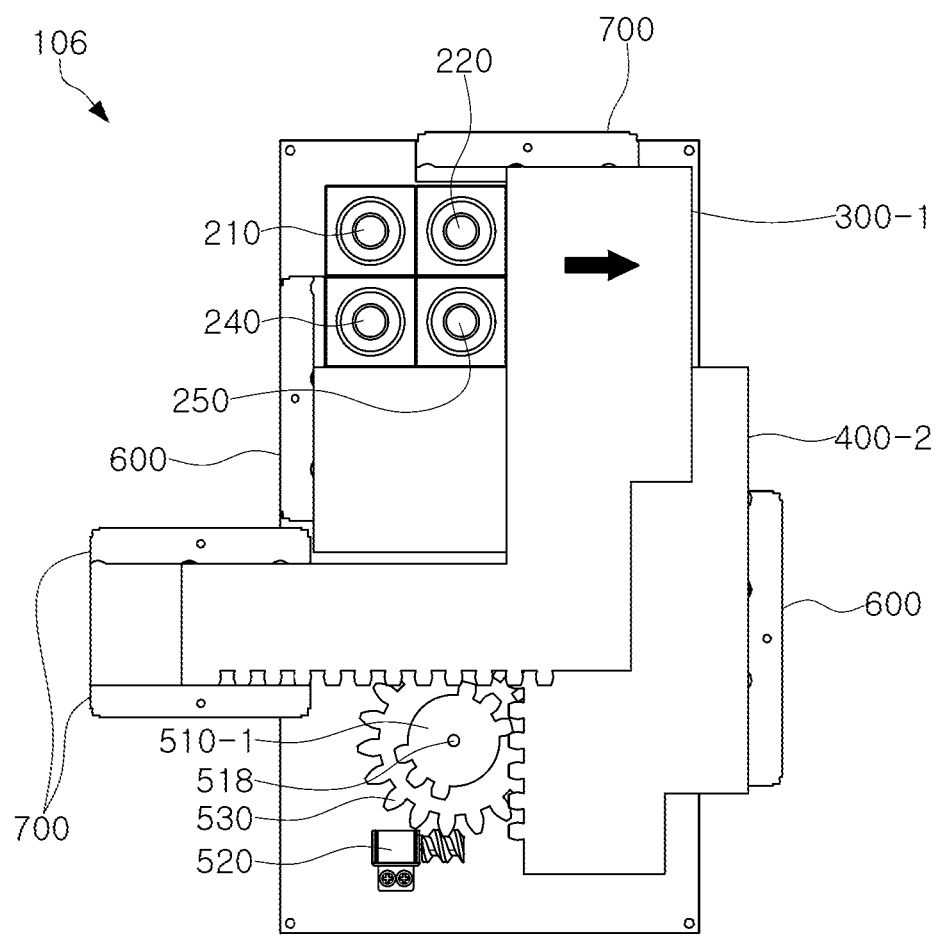

The third state (see FIG. 13) may be formed by driving the second light blocking member 400-1 in the second state. The second light blocking member 400-1 may be moved to the right along the second direction intersecting the optical axis by the driving gear 510-1 as illustrated in FIG. 13. When the camera module 106 is converted from the second state to the third state, the first light blocking member 300-1 may not be driven by the driving gear 510-1. For example, during a series of processes of converting the camera module 106 from the second state to the third state, the second rack 430 of the second light blocking member 400-1 may be engaged with the driving region 514 of the driving gear 510-1 and may enable the driving of the second light blocking member 400-1, and since the first rack 330 of the first light blocking member 300-1 faces the non-driving region 516 of the driving gear 510-1, the first rack 330 may not cause driving of the first light blocking member 300-1.

The camera module 106 may be configured to image through four lens modules, for example, the first, second, fourth, and fifth lens modules 210, 220, 240, and 250, in the third state. In the third state, the camera module 106 may simultaneously image each subject located at a short distance or a long distance or may image a subject located at a short distance, a medium distance, or a long distance through the first lens module 210, the second lens module 220, the fourth lens module 240, and the fifth lens module 250. For example, the camera module 106 may image subjects located at the same distance through the first lens module 210, the second lens module 220, the fourth lens module 240, and the fifth lens module 250. Alternatively, the camera module 106 may image a subject located at a short distance through the first lens module 210 and the second lens module 220, and may image a background of the subject located at a long distance through the fourth lens module 240 and the fifth lens module 250. Alternatively, the camera module 106 may image a subject located at a short distance through the first lens module 210, may image an image a subject at a long distance through the fourth lens module 240, and may image a subject located at a medium distance through the second lens module 220 and the fifth lens module 250. Also, the camera module 106 may image subjects located at the same distance through the first lens module 210, the second lens module 220, the fourth lens module 240, and the fifth lens module 250, and may programmatically synthesize the obtained images.

Figure 14:
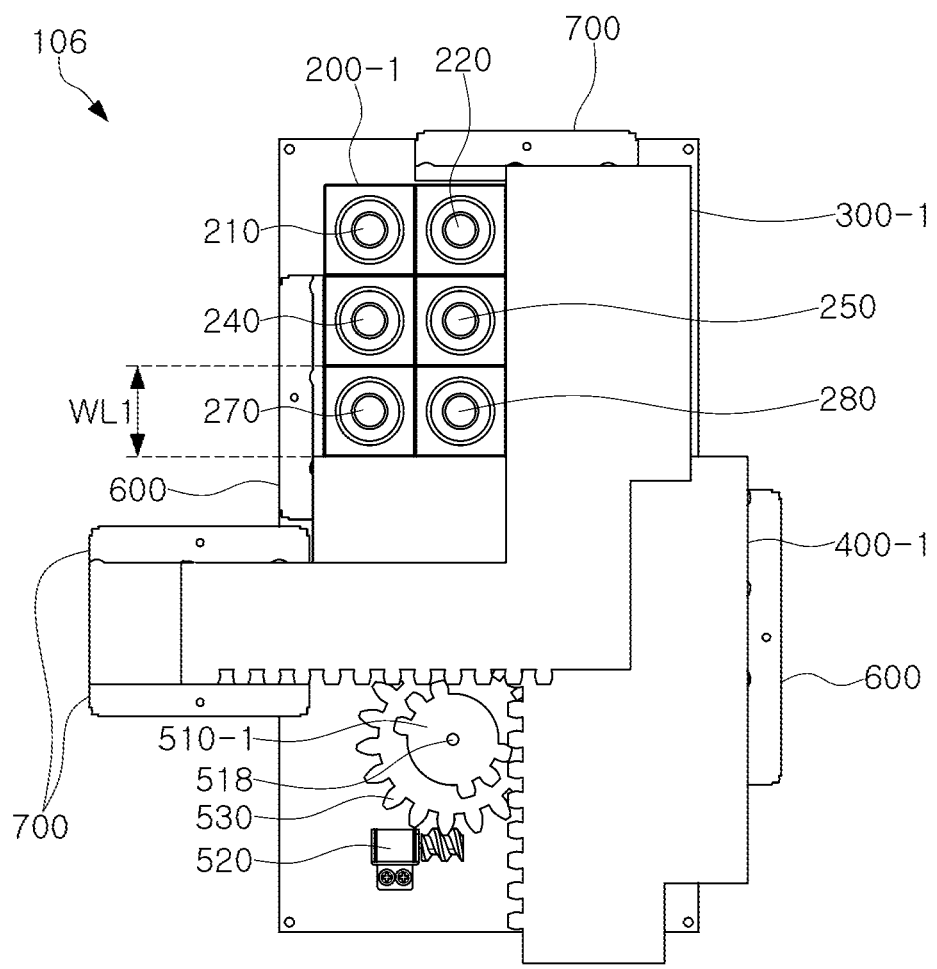

The fourth state (see FIG. 14) may be formed by driving the first light blocking member 300-1 in the third state. As illustrated in FIG. 14, the first light blocking member 300-1 may be further moved downwardly along the first direction intersecting the optical axis by the driving gear 510-1. The displacement of the first light blocking member 300-1 may be limited to the width WL1 of the seventh lens module 270. When the camera module 106 is converted from the third state to the fourth state, the second light blocking member 400-1 may not be driven by the driving gear 510-1. For example, during a series of processes of converting the camera module 106 from the third state to the fourth state, the first rack 330 of the first light blocking member 300-1 may be engaged with the driving region 514 of the driving gear 510-1 and may enable the driving of the first light blocking member 300-1, and since the second rack 430 of the second light blocking member 400-1 is not engaged with the driving region 514 of the driving gear 510-1, the second rack 430 may not cause driving of the second light blocking member 400-1.

The camera module 106 may image through six lens modules, for example, the first, second, fourth, fifth, seventh, and eighth lens modules 210, 220, 240, 250, 270, and 280, in the fourth state. In the fourth state, the camera module 106 may image a subject located at a short distance or a long distance or may image different subjects located at a short distance, a medium distance, or a long distance through the first, second, fourth, fifth, seventh, and eighth lens modules lens modules 210, 220, 240, 250, 270, and 280. For example, the camera module 106 may image a subject located at the same distance through the first, second, fourth, fifth, seventh, and eighth lens modules lens modules 210, 220, 240, 250, 270, and 280. Alternatively, the camera module 106 may image a subject located at a short distance through the first lens module 210 and the second lens module 220, may image a surrounding environment of a subject located at a medium distance through the fourth lens module 240 and the fifth lens module 250, and may image a background of the subject located at a long distance through the seventh lens module 270 and the eighth lens module 280. Alternatively, the camera module 106 may image subjects located at the same distance through the first, second, fourth, fifth, seventh, and eighth lens modules lens modules 210, 220, 240, 250, 270, and 280, respectively, and may programmatically synthesize the obtained images and may implement a single image.

Figure 15:
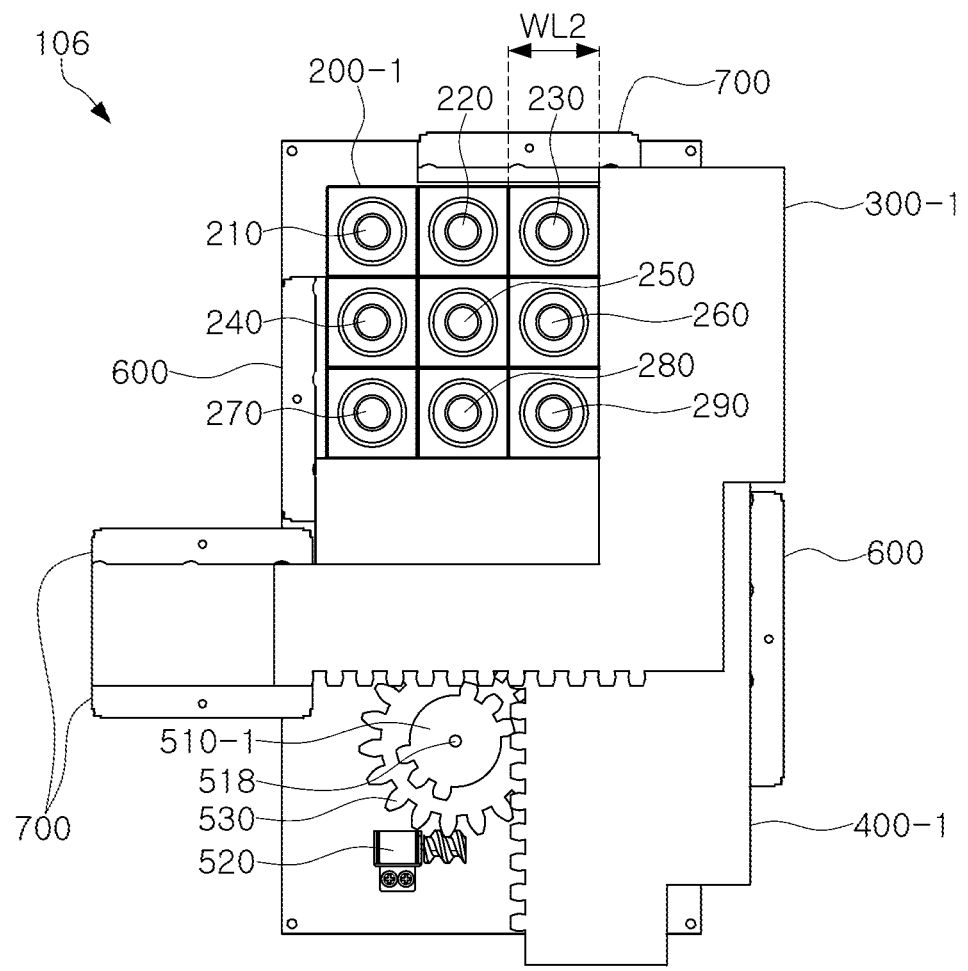

The fifth state (see FIG. 15) may be formed by driving the second light blocking member 400-1 in the fourth state. The second light blocking member 400-1 may be further moved to the right along the second direction intersecting the optical axis by the driving gear 510-1, as illustrated in FIG. 15. The displacement of the second light blocking member 400-1 may be limited to the width WL2 of the third lens module 230. When the camera module 106 is converted from the fourth state to the fifth state, the first light blocking member 300-1 may not be driven by the driving gear 510-1. For example, during a series of processes of converting the camera module 106 from the fourth state to the fifth state, the second rack 430 of the second light blocking member 400-1 may be engaged with the driving region 514 of the driving gear 510-1 and may enable the driving of the second light blocking member 400-1, and since the first rack 330 of the first light blocking member 300-1 is not engaged with the driving region 514 of the driving gear 510-1, the first rack 330 may not cause driving of the first light blocking member 300-1.

The camera module 106 may image through the first to ninth lens modules 210, 220, 230, 240, 250, 260, 270, 280, and 290 in the fifth state. In the fifth state, the camera module 106 may image a subject located at a short distance or a long distance, or may image different subjects located at a short distance, a medium distance, and a long distance through the first to ninth lens modules 210, 220, 230, 240, 250, 260, 270, 280, and 290. For example, the camera module 106 may image subjects located at the same distance through the nine lens modules 210, 220, 230, 240, 250, 260, 270, 280, and 290. Alternatively, the camera module 106 may image a subject located at a short distance through the first lens module 210 to the third lens module 230, may image a surrounding environment of a subject located at a medium distance through the fourth lens module 240 and the fifth lens module 250, and may image a background of the subject located at a long distance through the seventh lens module 270 and the eighth lens module 280. Alternatively, the camera module 106 may image subjects located at the same distance through the first to ninth lens modules 210, 220, 230, 240, 250, 260, 270, 280, and 290, respectively, and may programmatically synthesize the obtained images and may implement a single image.

The camera module 106 configured as above may quickly and clearly image a single subject through the first to ninth lens modules 210, 220, 230, 240, 250, 260, 270, 280, and 290. Also, the camera module 106 may clearly image a subject and various backgrounds around the subject using the first to ninth lens modules 210, 220, 230, 240, 250, 260, 270, 280, and 290. Also, the camera module 106 may obtain a three-dimensional shape of a subject using the first to ninth lens modules 210, 220, 230, 240, 250, 260, 270, 280, and 290. Further, the camera module 106 may express a depth of the subject using the first to ninth lens modules 210, 220, 230, 240, 250, 260, 270, 280, and 290.

In the description below, an electronic device 10, according to an embodiment, will be described with reference to FIGS. 16 and 17.

Figure 16:
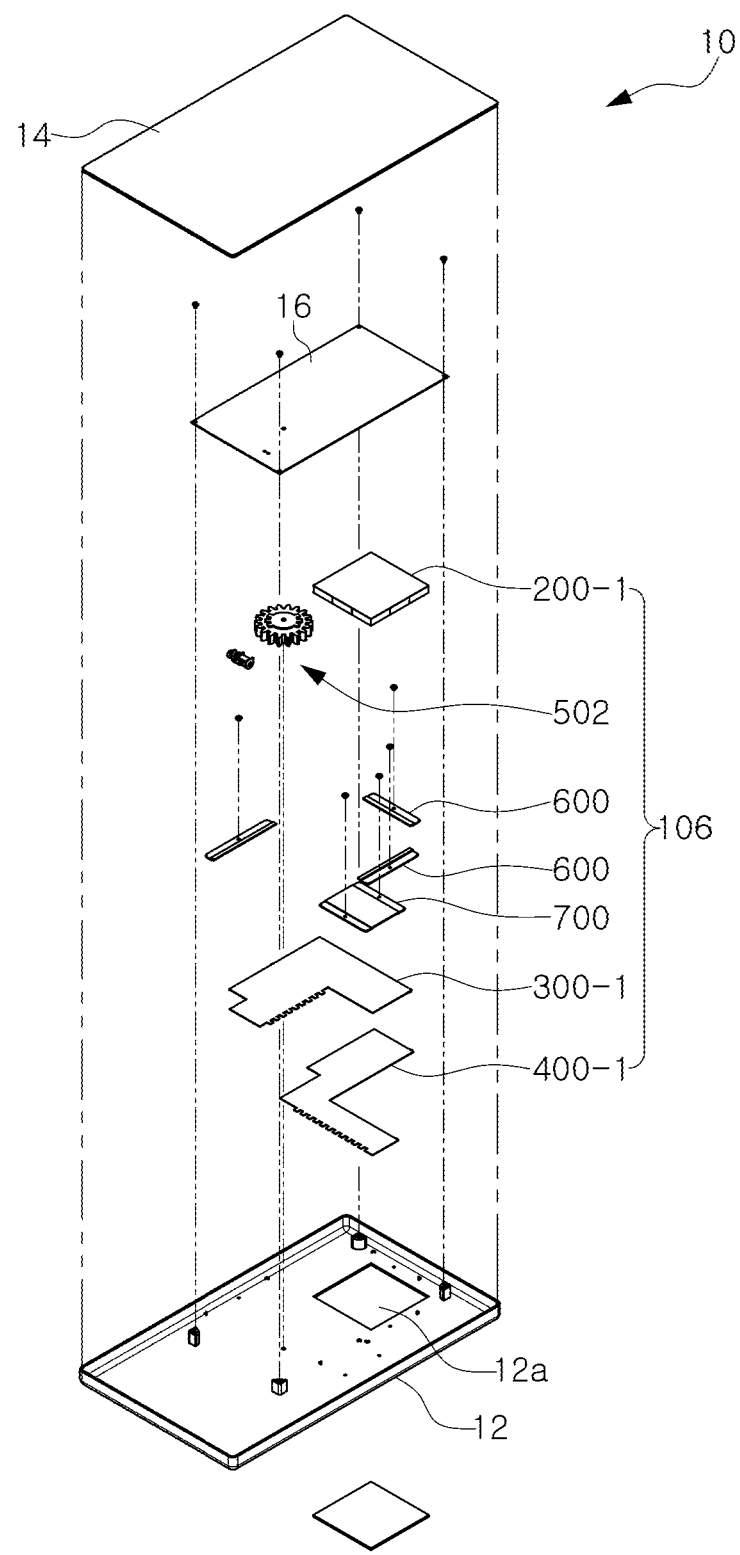
FIG. 16 is an exploded perspective diagram illustrating a portion of an electronic device, according to an embodiment.
Figure 17:
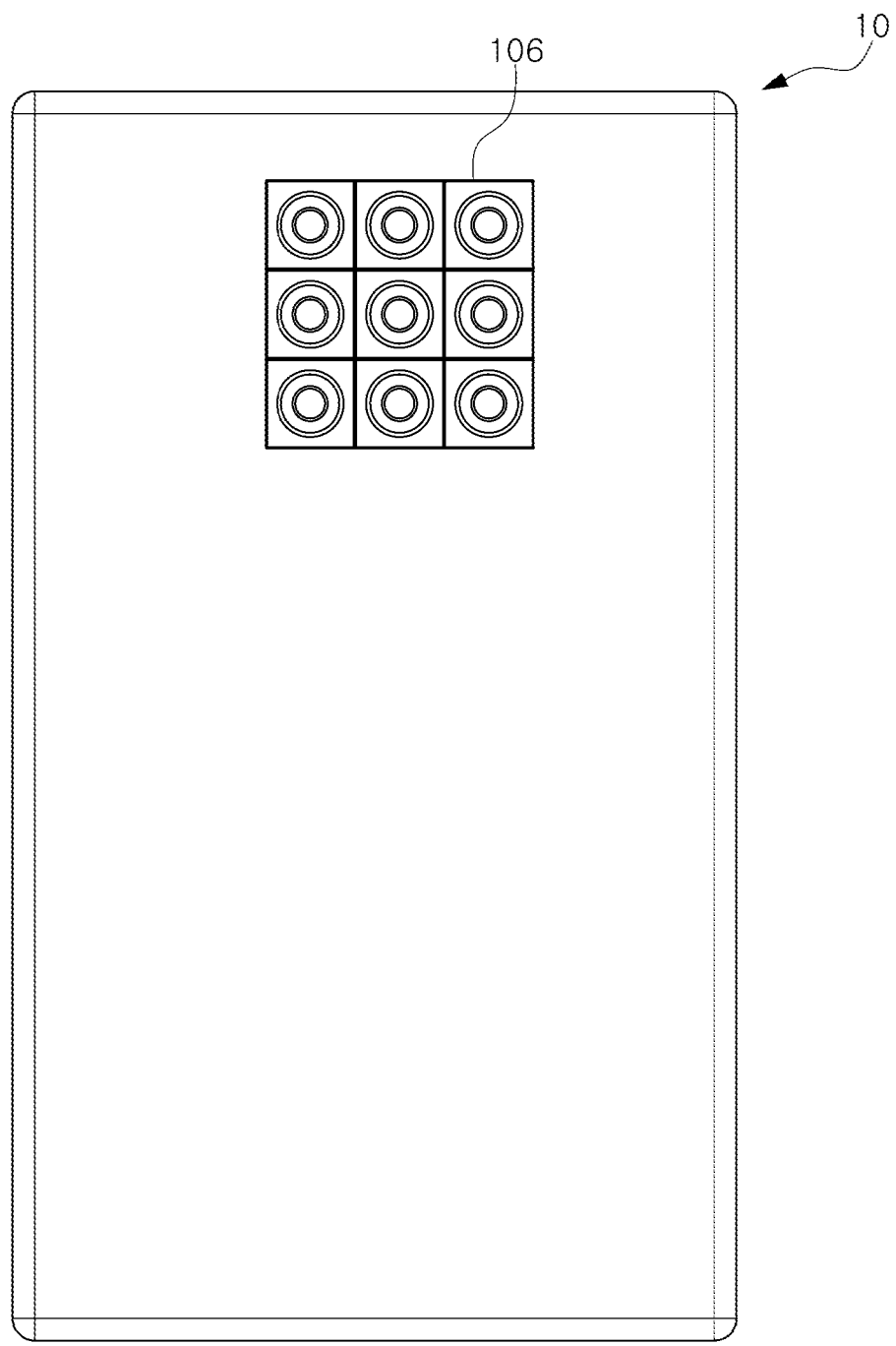
FIG. 17 is a diagram illustrating a rear surface of the electronic device illustrated in FIG. 16.

Referring to FIGS. 16 and 17, the electronic device 10 may be a portable product such as a portable telephone or a portable laptop. However, the electronic device 10 is not limited to being a portable product. For example, the electronic device 10 may be a security device for a building entrance door.

The electronic device 10 may include, for example, a housing 12, a screen display 14, and a substrate 16. Also, the electronic device 10 may include any of the camera modules 100, 102, 104, and 106 described in the aforementioned embodiments. However, for convenience of description, the electronic device 10 is illustrated as including the camera module 106 illustrated in FIG. 10.

The housing 12 may be configured to accommodate the screen display 14 and the camera module 106. An opening 12a for externally exposing a portion (e.g., a lens) of the camera module 106 may be formed in the housing 12. A size of the opening 12a may increase or decrease depending on the number of lens modules included in the camera module 106.

The screen display 14 may be configured as a component for visually outputting a function of the electronic device 10 or inputting a user command signal. For example, the screen display 14 may visually display an image or a video obtained through the camera module 106. Alternatively, the screen display 14 may display numbers and letters through which a user command signal may be input. The substrate 16 may electrically connect the screen display 14 to the camera module 106.

The electronic device 10 configured as described above may obtain an image and video with high-resolution through the camera module 106.

According to the aforementioned example embodiments, a camera module is capable of clearly imaging an object located in various environmental conditions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a plurality of lens modules disposed in a first direction and a second direction intersecting an optical axis;
   a first light blocking member configured to move in the first direction to selectively expose the plurality of lens modules;
   a second light blocking member configured to move in the second direction to selectively expose the plurality of lens modules; and
   a driving assembly configured to drive the first light blocking member and the second light blocking member.

2. The camera module of claim 1, wherein the first light blocking member includes a first rack extending in the first direction, and
   wherein the second light blocking member includes a second rack extending in the second direction.

3. The camera module of claim 2, wherein the driving assembly includes a driving gear configured to be engaged with the first rack and the second rack.

4. The camera module of claim 3, wherein the driving gear includes:
   a driving region including teeth; and
   a non-driving region excluding teeth.

5. The camera module of claim 4, wherein the driving region is formed in a rotationally symmetrical shape about a driving shaft of the driving gear.

6. The camera module of claim 4, wherein an arc length formed in the driving region is equal to a first length of a lens module, among the plurality of lens modules, in the first direction and a second length of the lens module in the second direction, and
   wherein the arc length is greater than the first length and the second length, or is equal to a gap between adjacent lens modules among the plurality of lens modules.

7. The camera module of claim 3, wherein the driving assembly further includes:
   a driving motor; and
   a power transmission gear configured to be engaged with a pinion of the driving motor, coupled to the driving shaft of the driving gear, and configured to rotate integrally with the driving gear.

8. The camera module of claim 1, further comprising:
   a first guide member configured to guide movement of the first light blocking member in the first direction; and
   a second guide member configured to guide movement of the second light blocking member in the second direction.

9. The camera module of claim 8, wherein the first light blocking member includes first protrusions spaced apart by a first gap in the first direction and being in contact with the first guide member, and
   wherein the second light blocking member includes second protrusions spaced apart by a second gap in the second direction and being in contact with the second guide member.

10. The camera module of claim 9, wherein the first guide member includes first grooves configured to partially receive the first protrusions, and spaced apart by the first gap, and
    wherein the second guide member includes second grooves configured to partially receive the second protrusions, and spaced apart by the second gap.

11. The camera module of claim 10, wherein the first gap and the second gap are equal to a first length of a lens module, among the plurality of lens modules, in the first direction and a second length of the lens module in the second direction, or
    wherein the first gap and the second gap are equal to a gap between adjacent lens modules among the plurality of lens modules.

12. The camera module of claim 1, wherein the plurality of lens modules include:
    a first lens module having first optical properties; and
    a second lens module having second optical properties.

13. The camera module of claim 12, further comprising:
    a third lens module having third optical properties.

14. An electronic device, comprising:
    the camera module of claim 1.

15. A camera module, comprising:
    a plurality of lens modules arranged in columns extending in a first direction and rows extending in a second direction, wherein the first direction and the second direction intersect optical axes of the plurality of lens modules;
    a first light blocking member;
    a second light blocking member; and
    a driving member configured to selectively move the first light blocking member and the second light blocking member in the first direction and the second direction, respectively, to expose one or more lens modules among the plurality of lens modules.

16. The camera module of claim 15, wherein the driving member is further configured to selectively move the first light blocking member in only the first direction, and selectively move the second light blocking member in only the second direction.

17. The camera module of claim 15, wherein the first light blocking member and the second light blocking member are configured to move in increments in the first direction and the second direction, respectively, to expose different combinations of lens modules among the plurality of lens modules.

18. The camera module of claim 15, wherein the first light blocking member includes a first rack extending in the first direction,
    wherein the second light blocking member includes a second rack extending in the second direction, and
    wherein the driving member comprises a gear including teeth disposed in driving regions, and the driving regions are spaced apart such that the teeth are configured to selectively engage the first rack and the second rack.

* * * * *